US007151433B2

(12) United States Patent
Chun

(10) Patent No.: US 7,151,433 B2
(45) Date of Patent: Dec. 19, 2006

(54) COMBINATION LED FLASHLIGHT AND GARAGE DOOR TRANSMITTER

(76) Inventor: James K. Chun, 2102-F Walsh Ave., Santa Clara, CA (US) 95050

( * ) Notice: Subject to any disclaimer, the term of this patent is extended or adjusted under 35 U.S.C. 154(b) by 225 days.

(21) Appl. No.: 10/823,240

(22) Filed: Apr. 12, 2004

(65) Prior Publication Data

US 2005/0032490 A1 Feb. 10, 2005

Related U.S. Application Data

(60) Provisional application No. 60/492,889, filed on Aug. 5, 2003.

(51) Int. Cl.
*G05B 19/00* (2006.01)
*B06R 25/00* (2006.01)

(52) U.S. Cl. ................................ 340/5.71; 340/426.36

(58) Field of Classification Search ............... 340/5.71, 340/426.36, 815.6; 455/571, 575.6; 361/752
See application file for complete search history.

(56) References Cited

U.S. PATENT DOCUMENTS

| | | | | |
|---|---|---|---|---|
| 5,744,984 | A * | 4/1998 | Drapac et al. | 327/89 |
| 5,786,106 | A * | 7/1998 | Armani | 429/98 |
| 5,822,192 | A * | 10/1998 | Hayashi | 361/752 |
| 6,873,203 | B1 * | 3/2005 | Latham et al. | 327/538 |
| 6,912,410 | B1 * | 6/2005 | Auten et al. | 455/572 |

* cited by examiner

*Primary Examiner*—Timothy Edwards, Jr.
(74) *Attorney, Agent, or Firm*—Dean A. Craine

(57) ABSTRACT

A combination LED flashlight and garage door opener transmitter with at least one LED disclosed that uses a voltage multiple circuit that enables the use of a single AA or AAA battery. The voltage multiple circuit raises the battery voltage from 1.5 volts to approximately 5 volts and then maintains it to energize the LED. The voltage multiple circuit is connected to the garage door opener transmitter.

8 Claims, 5 Drawing Sheets

COMBINATION LED FLASHLIGHT AND GARAGE DOOR TRANSMITTER

This utility patent application is based on the provisional patent application (60/492,889) filed on Aug. 5, 2003.

BACKGROUND OF THE INVENTION

1. Field of the Invention

This invention relates to flashlights, and more particularly to flashlights that can be used to open and close garage door openers.

2. Description of the Related Art

Small portable flashlights kept in a motor vehicle are relatively common. Typically they are kept in a glove box and only used in an emergency. Because the battery in the flashlight slowly discharges over time and because the flashlight is not tested regularly, the flashlight does not operate when needed.

It is well known that LED bulbs are more energy efficient, have longer lives, and are more mechanically reliable than incandescent bulbs. Because of these benefits, they are commonly used in small, portable lights such as flashlights. LED flashlights found in the prior art generally consist of one or more LED bulbs located inside a housing containing a plurality of batteries. Because LEDs require 5 volts of DC current for optimal illumination, at least three AA or AAA batteries connected in a series are used. As a result, most bright LED flashlights have relatively large housings. When an LED flashlight with a smaller housing is desired, for example with an LED key ring or fob, a single battery may be used but the flashlight illumination will be substantially reduced.

An LED flashlight that overcomes the above drawbacks is disclosed in a U.S. patent application Ser. No. 10/104,895) filed by the inventor on Mar. 22, 2002. Such a flashlight uses a voltage tripler and regulator that enables the use of a single AA or lithium battery. The voltage tripler is a “step-up power component” that raises the battery voltage from 1.5 volts to approximately 5 volts which, is required to sufficiently energize one or more LEDs. Garage door opener transmitters found in the motor vehicle are typically used on a daily basis. When the battery in the transmitter is discharged to a lower level, the transmitter does not operate, thus informing the user that the battery needs to be replaced.

What is needed is a small portable flashlight for use in a motor vehicle that informs the user that the battery is adequately charged for operation.

SUMMARY OF THE INVENTION

It is an object of the present invention to provide a portable flashlight for use in a motor vehicle.

It is another object of the present invention to provide such a flashlight that uses a battery that is used frequently, to inform the user that it is adequately charged for operation.

It is another object of the present invention to provide such a flashlight that is combined with another electronic device frequently used in the motor vehicle which uses the same battery.

These and other objects of the present invention are met by a combination flashlight and remote garage door opener transmitter. The device includes an LED light circuit, a power circuit and a voltage multiplying circuit all mounted on a printed circuit board. The LED light circuit includes at least one main LED that optimally operates at 5.0 volts. The power circuit includes at least one single AA or AAA battery mounted inside the flashlight and electrically connected to the voltage multiplying circuit that raises and maintains the battery voltage from 1.5 volts to approximately 5 volts.

Connected to the voltage detector circuit is a trainable, garage door opener transmitter circuit that generates a control signal that communicates with a garage door opener receiver. The transmitter circuit is also connected to the voltage multiplying circuit to operate at 5.0 volts. During use, the working voltage of the device is maintained at 5.0 volts for operating both the LED circuit and the transmitter circuit. Since, the two circuits use the same battery, operation of one circuit informs the user of the operational status of the other circuit.

DESCRIPTION OF THE PREFERRED EMBODIMENT(S)

Figure 1:
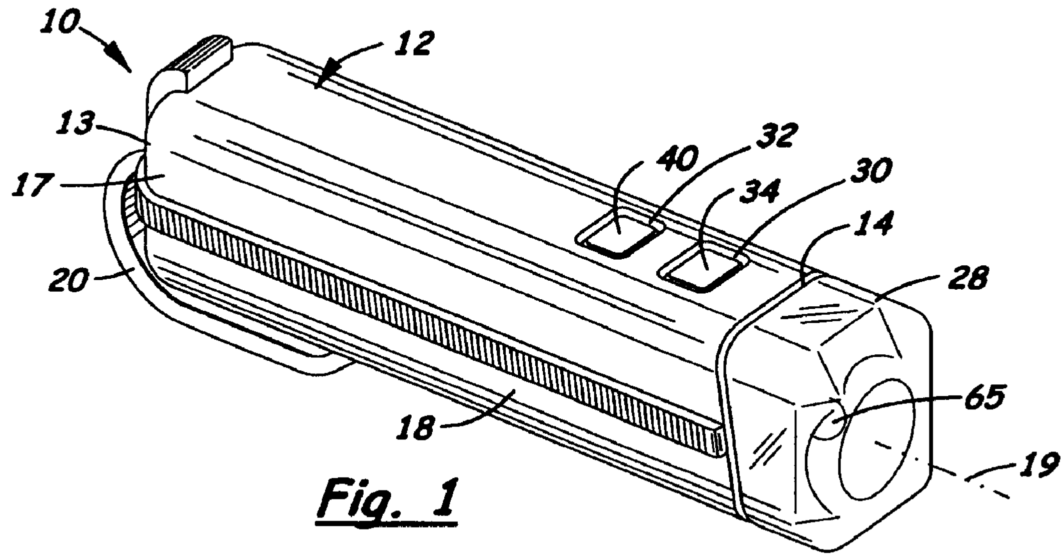
FIG. 1 is a perspective view of the combination LED flashlight and garage door transmitter.
Figure 2:
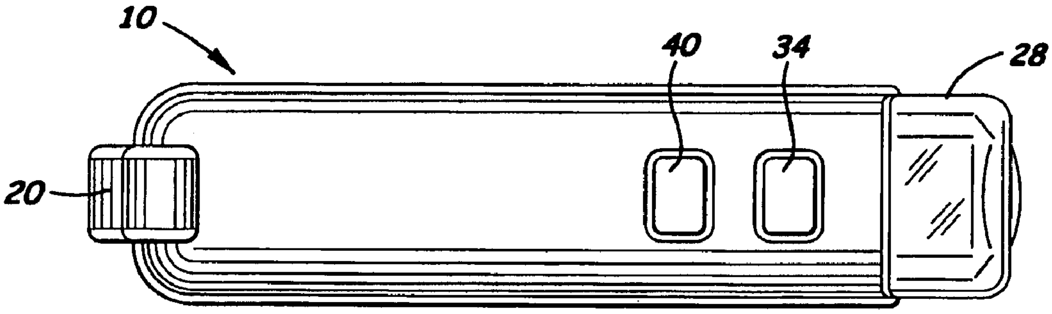
FIG. 2 is a top plan view of the invention.
Figure 3:
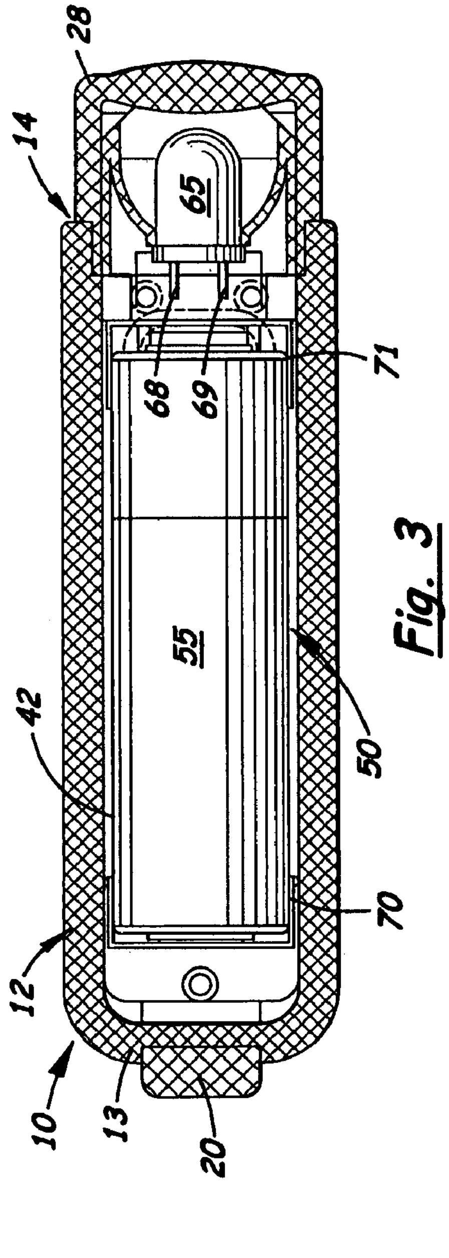
FIG. 3 is a sectional, top plan view of the invention.
Figure 4:
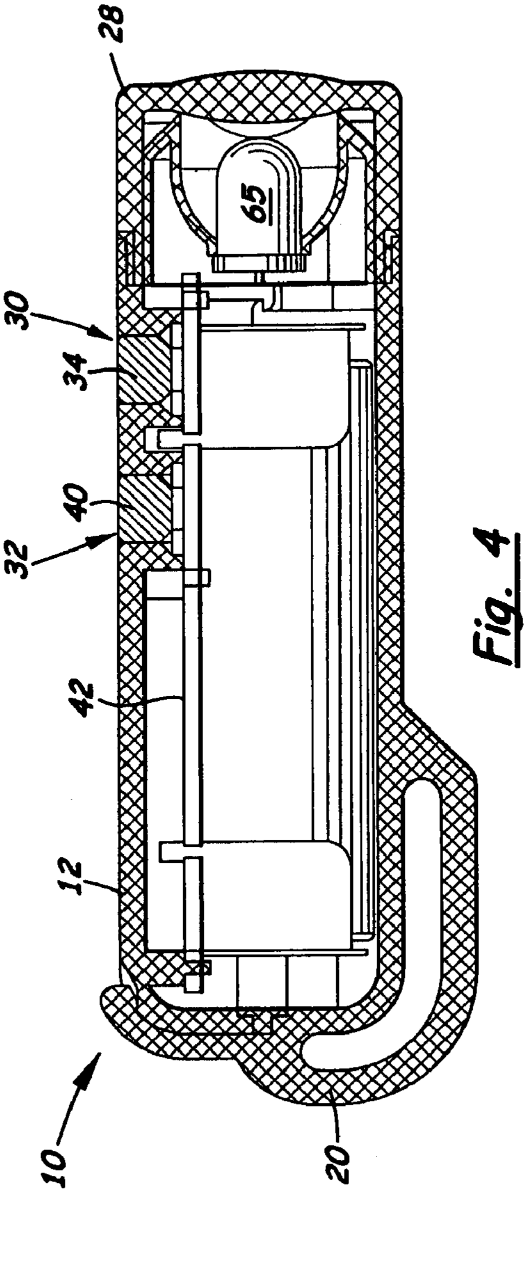
FIG. 4 is a left side elevational view of the invention.
Figure 5:
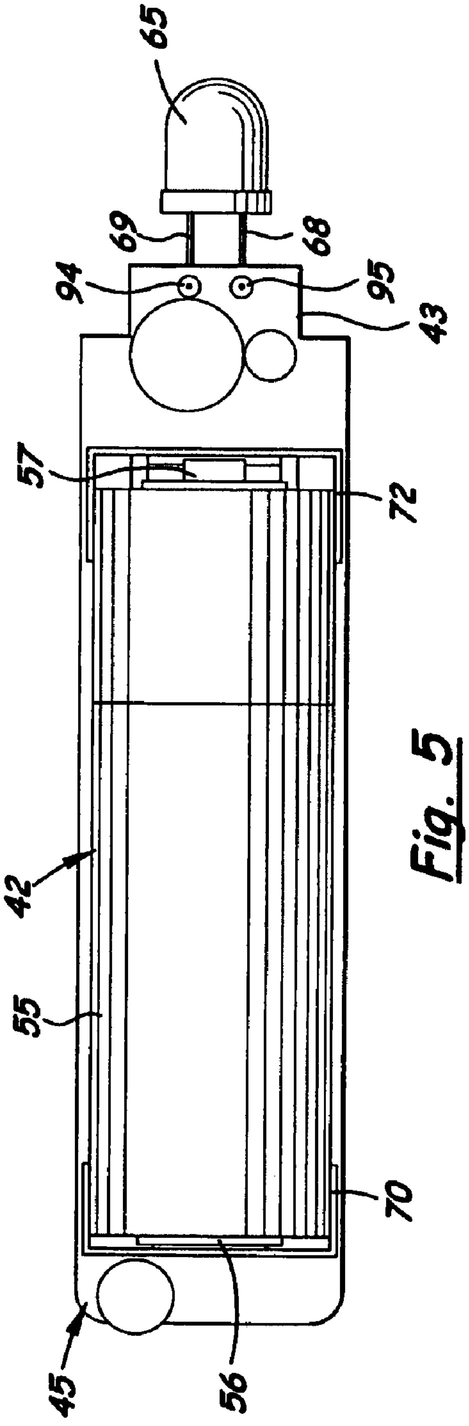
FIG. 5 is a left side elevational view of the device showing the location of the battery, printed circuit board, and the LED.
Figure 6:
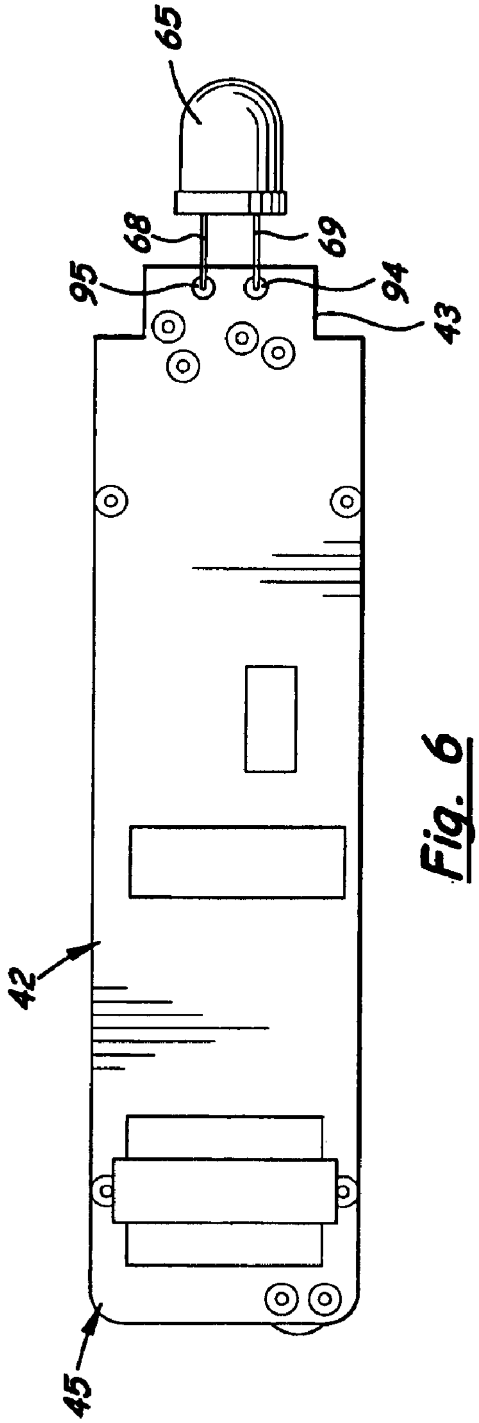
FIG. 6 is a right side elevational view of the device showing the location of the printed circuit and LED.

Referring to the accompanying FIGS. 1–8, there is shown and described a combination LED flashlight and garage door opener transmitter, generally referred to as device 10. The device 10 includes an elongated hollow body 12, with a closed end 13 and a transparent main lens 28 that attaches over an open end 14. The body 12, which is made of a clear or colored plastic or similar material, is made of two half components 17, 18 that snap together along the body's central longitudinal axis 19. Formed on the closed end 13 of the body 12 is an optional key ring 20.

The LED flashlight component is nearly identical to the LED flashlight disclosed in U.S. patent application Ser. No. 10/104,895, filed Mar. 22, 2002, which is now incorporated by reference herein.

Attached over the open end 14 of the main body 12 is a transparent lens 28 made of plastic or similar material. The lens 28 snaps into the perimeter edges of two half components 17, 18 that form the open end 14.

Formed on the outer surface of each main body 12 are two switch holes 30, 32 through which a main on/off switch button 34, garage door function button 40, 40' extends, respectively.

As shown in FIGS. 3–6, an elongated printed circuit board 42 is longitudinally aligned inside the main body 12. Aligned perpendicularly on the proximal end of the printed circuit board 42 is a smaller, multiple LED printed circuit board 43. The main printed circuit board 42 is slightly offset from the longitudinal axis 19 of the main body 12, thereby creating a longitudinally aligned cavity 50 inside the main body 12 for a single battery AA or AAA 55.

Figure 8:
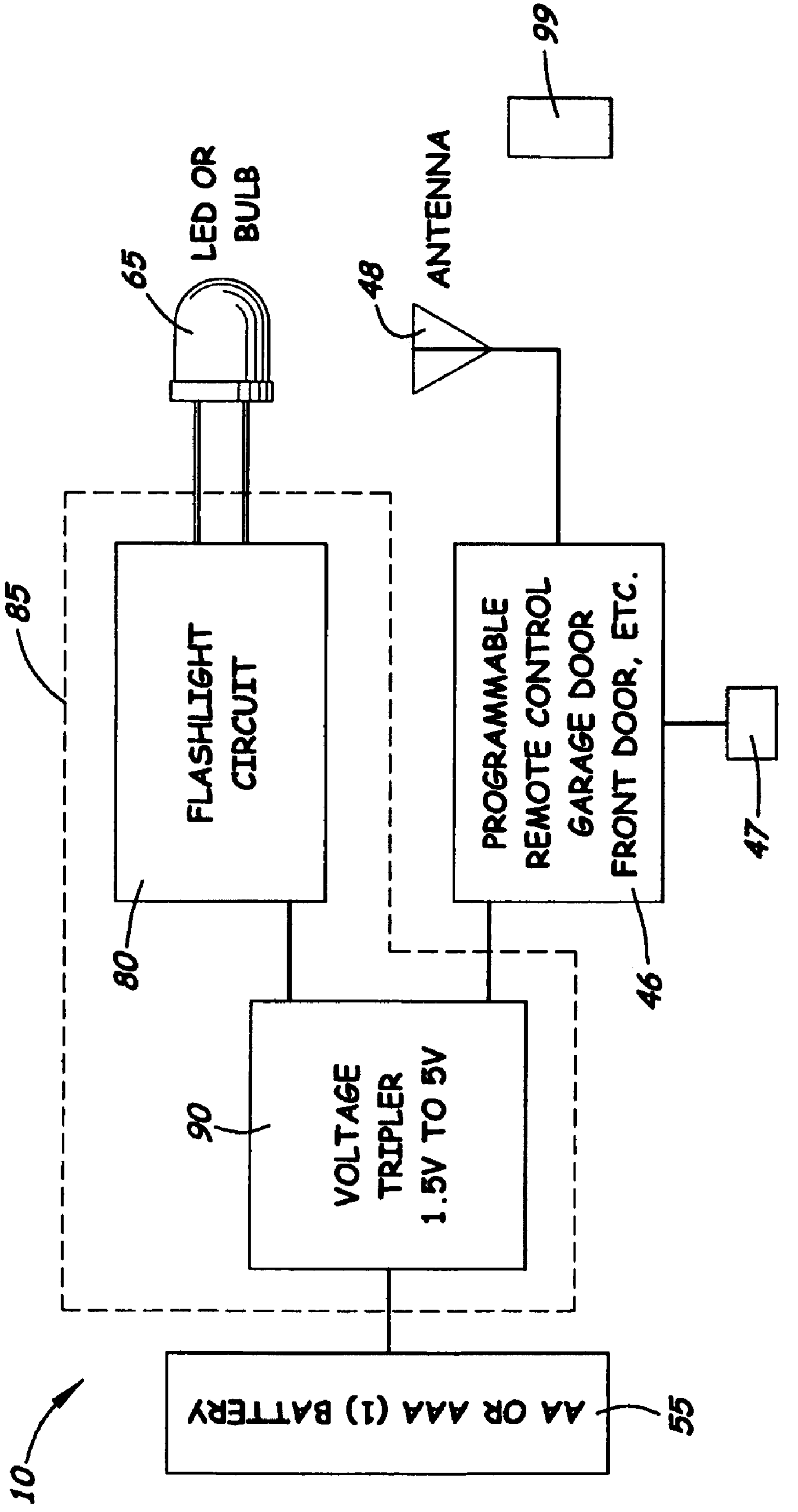
FIG. 8 is a block diagram of the device.

Connected to the printed circuit board 43 is a trainable, garage door opener transmitter circuit, generally denoted as 46 in FIG. 8 that generates a control signal that communicates with a garage door opener receiver 99. The circuit 46 includes an encoder circuit 47 and an antenna 48 that activates a garage door opener (not shown).

Figure 7:
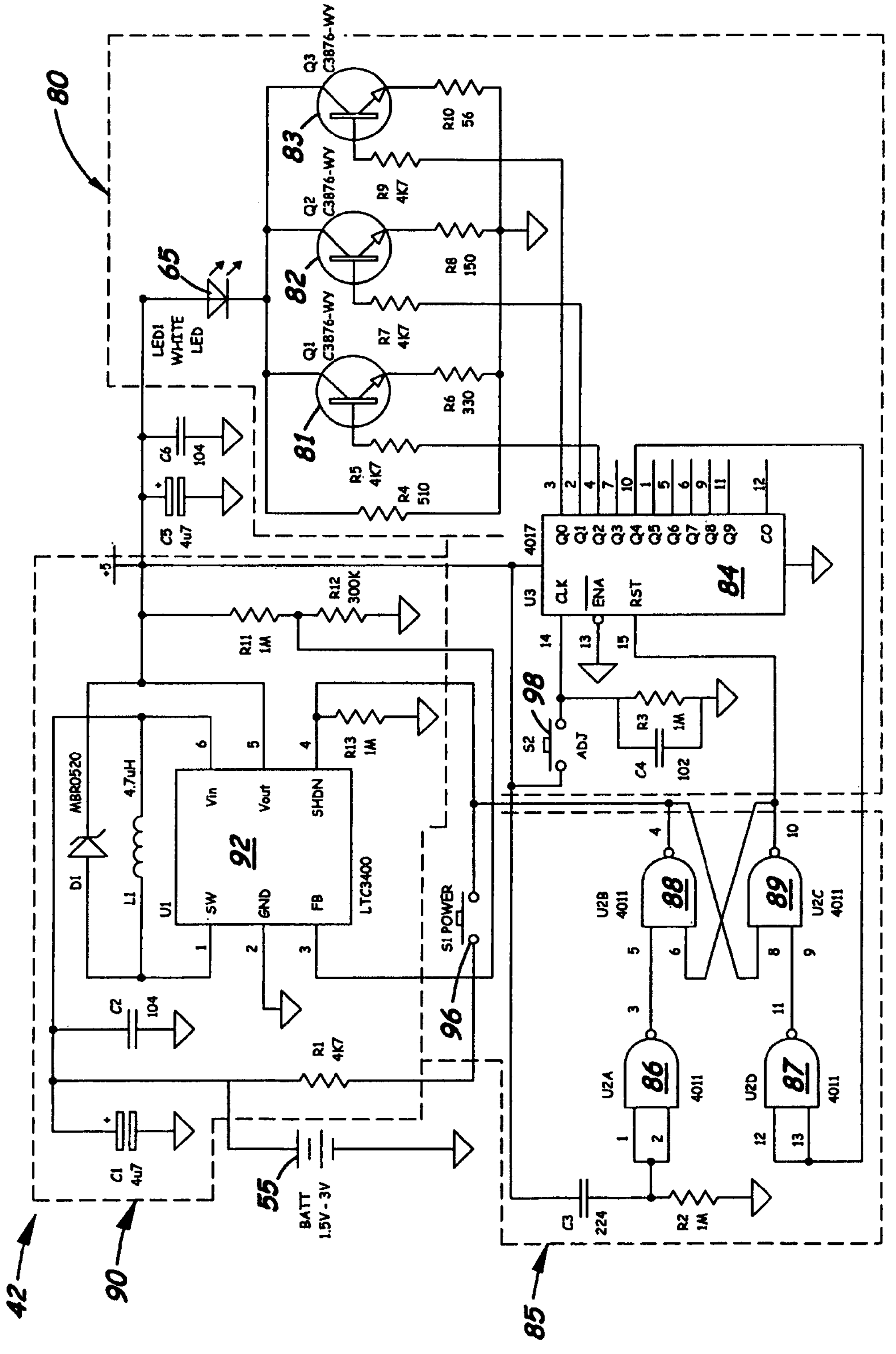
FIG. 7 is an electrical diagram of the LED light circuit, the voltage multiplying circuit and the power circuit.

FIG. 7 is a schematic of the printed circuit board 42 used in the device 10. The printed circuit board 42 includes a LED light circuit 80, a power circuit 85, and a voltage multiplying circuit 90. The LED light circuit 80 includes at least one LED bulb 65 connected to three NPN transistors 81–83 connected in a series to a CMOS semi-conductor 84. An optional dimmer switch 98 is connected between the CMOS semi-conductor 84 and the LED bulb 65. The power circuit 85 includes a main on/off switch 96 and four NAND logic gales 86–89 that control the switch control logic and the brightness control logic. The voltage multiplying circuit 90 includes a synchronous boost converter 91 that connects to a 1.5 volt battery 55 and triples the output voltage to approximate 4.5 volts and maintains the output voltage at or near 4.5 volts.

In the preferred embodiment, the synchronous boost converter 91 is a six lead thin SOT 92 with a frequency, step-up DC/DC converted capable of supplying approximately 5.0V at 150 MA from a single 1.5 volt battery input. Such converters contain an internal NMOS switch and a PMOS synchronous rectifier that multiple and automatically adjust and maintains output voltage at a desired voltage as the input voltage drops. An example of a synchronous boost converter (Model No. LTC 3400) that may be used is sold by Linear Technology Corporation located in Milpitas, Calif.

FIG. 8 is a block diagram of the device showing the relative connections of the LED garage door transmitter circuit 46, the LED light circuit 80 and the voltage multiplying circuit 90.

Table 1 lists the codes, names, and functions of the components shown in FIG. 7.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

TABLE 1

| Designators | Qty | Description |
|---|---|---|
| C1 | 1 | Miniature Electrolytic Capacitor |
| C2 | 1 | Chip Capacitor |
| C3 | 1 | Chip Capacitor |
| C4 | 1 | Chip Capacitor |
| C5 | 1 | Miniature Electrolytic Capacitor |
| C6 | 1 | Chip Capacitor |
| C8 | 1 | Chip Capacitor |
| C9 | 1 | Chip Capacitor |
| D1 | 1 | Schottky Barrier Rectifier |
| D2 | 1 | "n" |
| LED1 | 1 | Nichia White LED Lamp |
| Q1 | 1 | NPN Transistor |
| Q2 | 1 | NPN Transistor |
| Q3 | 1 | NPN Transistor |
| R1 | 1 | Chip Resistor |
| R10 | 1 | Chip Resistor |
| R11 | 1 | Chip Resistor |
| R12 | 1 | Chip Resistor |

TABLE 1-continued

| Designators | Qty | Description |
|---|---|---|
| R13 | 1 | Chip Resistor |
| R14 | 1 | Chip Resistor |
| R15 | 1 | Chip Resistor |
| R2 | 1 | Chip Resistor |
| R3 | 1 | Chip Resistor |
| R4 | 1 | Chip Resistor |
| R5 | 1 | Chip Resistor |
| R6 | 1 | Chip Resistor |
| R7 | 1 | Chip Resistor |
| R8 | 1 | Chip Resistor |
| R9 | 1 | Chip Resistor |
| PCB | 1 | Printed Circuit Board |
| U1 | 1 | Synchronous Boost Converter |
| U2 | 1 | CMOS Quad 2-input NAND gate |

I claim:

1. A combination LED flashlight and garage door opener transmitter, comprising:

a. a housing adapted to hold a battery;

b. at least one battery disposed inside said housing;

c. at least one LED located in said housing and used as a flashlight to illuminate a nearby surface or object;

d. a voltage multiplier circuit coupled between said LED and said battery, said voltage multiplier circuit includes a synchronous boost converter that automatically adjusts and maintains the output voltage from said battery to continuously activate said LED as the internal voltage of said battery decreases;

e. an ON-OFF switch electrically connected between said battery and said LED;

f. a garage door opener transmitter electrically connected to said battery; and g. a garage door function switch connected to said garage door opener transmitter.

2. The combination flashlight and garage door opener as recited in claim 1, wherein said synchronous boost converter is capable of supplying 3.3 volts at 150 MA.

3. The combination LED flashlight and garage door opener transmitter as recited in claim 1, where said battery supplies 1.5 volts.

4. The combination LED flashlight and garage door opener transmitter as recited in claim 1, wherein said flashlight includes two LED's.

5. The combination LED flashlight and garage door opener transmitter as recited in claim 1, further including a key ring attached to said housing.

6. The combination LED flashlight and garage door opener transmitter as recited in claim 1, further including a lens located around said LED.

7. The combination LED flashlight and garage door opener transmitter as recited in claim 6, further including a reflector located inside said lens and disposed around said LED.

8. The combination LED flashlight and garage door opener transmitter as recited in claim 1, wherein said housing is watertight.

* * * * *